(12) United States Patent
Park

(10) Patent No.: US 12,042,061 B2
(45) Date of Patent: Jul. 23, 2024

(54) CHAIR INCLUDING MULTI-CHANNEL SOUND SYSTEM

(71) Applicant: TROUND INC., Hanam-si (KR)

(72) Inventor: Jea Bum Park, Namyangju-si (KR)

(73) Assignee: TROUND INC., Hanam-si (KR)

( * ) Notice: Subject to any disclaimer, the term of this patent is extended or adjusted under 35 U.S.C. 154(b) by 232 days.

(21) Appl. No.: 17/821,332

(22) Filed: Aug. 22, 2022

(65) Prior Publication Data

US 2022/0395101 A1   Dec. 15, 2022

Related U.S. Application Data

(63) Continuation of application No. PCT/KR2021/005546, filed on May 3, 2021.

(30) Foreign Application Priority Data

May 15, 2020   (KR) .................... 10-2020-0058065

(51) Int. Cl.
| | |
|---|---|
| A47C 7/72 | (2006.01) |
| H04R 1/02 | (2006.01) |
| H04R 5/02 | (2006.01) |
| H04R 3/12 | (2006.01) |
| B60N 2/879 | (2018.01) |
| B64D 11/00 | (2006.01) |

(52) U.S. Cl.
CPC ............. *A47C 7/727* (2018.08); *B60N 2/879* (2018.02); *B64D 11/00154* (2014.12); *H04R 1/025* (2013.01); *H04R 1/026* (2013.01); *H04R 1/028* (2013.01); *H04R 3/12* (2013.01); *H04R 5/023* (2013.01)

(58) Field of Classification Search
USPC ........................... 297/271.4, 217.5; 381/301
See application file for complete search history.

(56) References Cited

U.S. PATENT DOCUMENTS

| | | | | |
|---|---|---|---|---|
| 3,512,605 | A * | 5/1970 | Mccorkle ............... | B60N 2/812 |
| | | | | 381/301 |
| 4,075,438 | A * | 2/1978 | Kappel .................. | H04R 5/023 |
| | | | | 381/301 |
| 4,440,443 | A * | 4/1984 | Nordskog .............. | B60N 2/882 |
| | | | | 297/217.4 |
| 4,797,934 | A * | 1/1989 | Hufnagel ............... | A47C 7/727 |
| | | | | 297/400 |

(Continued)

FOREIGN PATENT DOCUMENTS

| | | | | |
|---|---|---|---|---|
| CN | 206623779 U | * | 11/2017 | |
| CN | 209472760 U | * | 10/2018 | ............... H04R 5/02 |

(Continued)

OTHER PUBLICATIONS 4 page PDF or translation of Written Opinion dated Aug. 9, 2021 in parent PCT/KR2021/005546. (Year: 2021).*

(Continued)

*Primary Examiner* — Robert Canfield
(74) *Attorney, Agent, or Firm* — Studebaker & Brackett PC

(57) ABSTRACT

The present invention relates to a chair including a multi-channel sound system, and more particularly, to a chair including a multi-channel sound system capable of providing rich sound effects to a user who sits in the chair through sounds output from a plurality of channels.

17 Claims, 16 Drawing Sheets

(56) References Cited

U.S. PATENT DOCUMENTS

| | | | | |
|---|---|---|---|---|
| 5,887,071 | A * | 3/1999 | House | H04R 5/02 381/87 |
| 5,889,875 | A * | 3/1999 | Caron | A47C 7/727 381/345 |
| 5,997,091 | A * | 12/1999 | Rech | B60N 2/838 297/391 |
| 6,057,659 | A * | 5/2000 | Akiyama | H04R 5/02 381/387 |
| 8,553,890 | B2 * | 10/2013 | Yokota | H04R 5/023 381/1 |
| 8,858,343 | B2 * | 10/2014 | Filipour | A47C 7/727 463/47 |
| 8,950,813 | B2 * | 2/2015 | Nawaz | B60N 2/885 297/398 |
| 9,596,544 | B1 * | 3/2017 | Brotherton | H04R 19/02 |
| 9,950,793 | B2 * | 4/2018 | Tracy | H04R 5/023 |
| 10,479,235 | B1 * | 11/2019 | Stroud | B60N 2/976 |
| 10,562,426 | B2 * | 2/2020 | Scott | B60N 2/0244 |
| 10,820,103 | B1 * | 10/2020 | Hudson, III | H04R 5/023 |
| 11,367,428 | B2 * | 6/2022 | Soltner | G10K 11/17817 |
| 11,490,197 | B1 * | 11/2022 | Wu | A63F 13/98 |
| 2007/0001494 | A1 * | 1/2007 | Hoover | A63F 13/28 297/217.4 |
| 2007/0280484 | A1 | 12/2007 | Anderson | |
| 2011/0193380 | A1 * | 8/2011 | Yamada | A61G 15/125 297/217.4 |
| 2011/0235832 | A1 * | 9/2011 | Riopel | A47G 9/1045 381/300 |
| 2012/0170788 | A1 * | 7/2012 | Jagne | H04R 1/1091 381/380 |
| 2017/0106775 | A1 * | 4/2017 | Takada | H04R 1/2819 |
| 2017/0134837 | A1 * | 5/2017 | Rosen | H04R 5/023 |
| 2018/0118063 | A1 * | 5/2018 | Oswald | B64D 11/00154 |
| 2018/0201373 | A1 * | 7/2018 | Tracy | B64D 11/00154 |
| 2019/0106039 | A1 * | 4/2019 | Winton | H04R 5/023 |
| 2019/0118688 | A1 * | 4/2019 | Fujikake | B60R 11/0217 |
| 2019/0182593 | A1 * | 6/2019 | Guerrini | H04S 7/30 |
| 2020/0054518 | A1 * | 2/2020 | Noso | A61H 23/0254 |
| 2020/0128312 | A1 * | 4/2020 | Christoph | H04R 1/025 |
| 2020/0189436 | A1 * | 6/2020 | Soltner | H04R 1/025 |
| 2020/0398722 | A1 * | 12/2020 | Soltner | H04R 1/2857 |
| 2021/0127841 | A1 * | 5/2021 | Park | A47C 7/727 |
| 2021/0129708 | A1 * | 5/2021 | Kim | A61B 5/282 |
| 2021/0188141 | A1 * | 6/2021 | Mizobata | B60R 16/03 |
| 2021/0345786 | A1 * | 11/2021 | Peng | A47C 1/0303 |
| 2022/0047084 | A1 * | 2/2022 | Chalfin | H04R 5/023 |
| 2022/0202190 | A1 * | 6/2022 | Sim | H04R 5/033 |
| 2022/0211179 | A1 * | 7/2022 | Vasanth | A61B 5/1116 |
| 2022/0225018 | A1 * | 7/2022 | Hayasaka | H04R 1/025 |
| 2022/0337928 | A1 * | 10/2022 | Nelson | A47C 31/008 |
| 2023/0001834 | A1 * | 1/2023 | Dillinger | G10K 11/1752 |

FOREIGN PATENT DOCUMENTS

| | | | | |
|---|---|---|---|---|
| JP | 2000004983 | A * | 1/2000 | |
| JP | 2001112572 | A * | 4/2001 | B60N 2/4876 |
| JP | 2009-017278 | A | 1/2009 | |
| JP | 2018-094179 | A | 6/2018 | |
| KR | 10-2004-0026541 | A | 3/2004 | |
| KR | 10-2006-0090041 | | * 8/2006 | |
| KR | 10-2011-0023277 | A | 3/2011 | |
| KR | 201123227 | A * | 3/2011 | |
| KR | 102010037104 | | * 4/2016 | H04R 5/02 |
| KR | 20210090410 | A * | 7/2021 | A47C 7/54 |
| KR | 20220005266 | A * | 1/2022 | A47C 7/727 |
| KR | 20220030078 | A * | 3/2022 | H04S 3/00 |
| WO | WO-2020234317 | A1 * | 11/2020 | H04R 1/06 |
| WO | WO-2022147346 | A1 * | 7/2022 | |

OTHER PUBLICATIONS 12 page PDF of machine translation of JP 2018-094179-A. (Year: 2018).*

2 page PDF of search report dated 5/05/822 for PCT/US2021/065812. (Year: 2021).*

8 page PDF of Written Opinion dated May 5, 2021 for PCT/US2021/065812. (Year: 2021).*

International Search Report issued in PCT/KR2021/005546; dated Aug. 9, 2021.

Office Action issued in KR 10-2020-0058065; mailed by the Korean Patent Office dated Jan. 27, 2022.

* cited by examiner (a)

(b)

CHAIR INCLUDING MULTI-CHANNEL SOUND SYSTEM

CROSS-REFERENCE TO RELATED APPLICATION

This application is based on the PCT Application No. PCT/KR2021/005546, filed on May 3, 2021, and claims the benefit of priority from the Korean Patent Application No. 10-2020-0058065, filed on May 15, 2020, the disclosure of which is incorporated herein by reference in its entirety.

BACKGROUND

1. Field of the Invention

The present invention relates to a chair including a multi-channel sound system, and more particularly, to a chair including a multi-channel sound system capable of providing rich sound effects to a user who sits in the chair through sounds output from a plurality of channels.

2. Discussion of Related Art

In general, a speaker used while being connected to a computer generates sound by converting a current flowing through a wire into an electrical signal and a vibration signal and generating vibrations using a vibration portion.

For example, when watching a movie or playing a game using a computer, a user not only watches images on a screen of the computer but also listens to sounds due to an electrical signal being transferred and vibrations generated by a speaker corresponding to the images being transferred to ears of the user while the user sits in a chair where a monitor of the computer is seen.

Particularly, a multi-channel sound system including a plurality of such speakers has an advantage of allowing a user to more exquisitely experience a direction, level, and the like of a sound in an image.

However, in order to implement such multi-channel sound systems, it is necessary to provide a plurality of speakers above and below a desk, behind a chair, and the like and to electrically connect all of the plurality of speakers such that there is a great restriction in space.

Also, although a multi-channel sound system is implemented by arranging the plurality of speakers, there is a problem that a position of the chair is changed or a variety of physical interferences are present between the speakers and the user who sits in the chair.

SUMMARY OF THE INVENTION

The present invention is directed to providing a chair having a sound output portion in which a multi-channel sound system is implemented, the sound output portion capable of being installed in a headrest portion of the chair or a part at which the headrest portion is connected to a backrest portion or capable of replacing the headrest portion.

The present invention is directed to providing a chair in which a sound output portion, in which a multi-channel sound system is implemented, is installed in at least one selected from 1) a headrest portion configured to support a head part of a user, 2) a backrest portion configured to support a back and waist part of the user, and 3) a seat portion configured to support a buttocks part and a part of legs of the user.

According to one aspect of the present invention, there is provided a chair including at least 1) a headrest portion configured to support a head part of a user, 2) a backrest portion configured to support a back and waist part of the user, and 3) a seat portion configured to support a buttocks part and a part of legs of the user.

In one embodiment, a sound output portion which receives a multi-channel sound signal and implements a multi-channel sound system may be installed in at least one of the headrest portion, the backrest portion, and the seat portion.

Here, the sound output portion may include a first speaker mounting portion provided to extend in a first direction and in which at least one speaker is installed, a second speaker mounting portion provided to extend in a second direction intersecting the second direction on one side of the first speaker mounting portion and in which at least one speaker is installed, and a third speaker mounting portion provided to extend in the second direction intersecting the first direction on the other side of the first speaker mounting portion and in which at least one speaker is installed.

In one embodiment, the first speaker mounting portion to the third speaker mounting portion may include a speaker installation area which is divided into a first area formed to extend in a direction perpendicular to the ground, a second area formed to protrude from an upper portion of the first area toward where a user who sits in the chair is positioned, and a third area formed to protrude from a lower portion of the first area toward where the user who sits in the chair is positioned.

Here, the speaker may be installed in at least one area selected from the first area to the third area.

According to the embodiment described above, the at least one speaker installed in the first area may be installed in a half-closed type space formed by the first area to the third area and may allow a sound generated from the speaker to stay in a predetermined space instead of immediately propagating to a surrounding environment, and thus providing richer sound effects to the user using the chair is possible.

Also, in another embodiment, the sound output portion may further include an opening/closing portion installed to be slidably movable on an upper portion of each of the first speaker mounting portion to the third speaker mounting portion and configured to open or close an upper space divided on the basis of the first speaker mounting portion to the third speaker mounting portion.

Here, the opening/closing portion may include a first half opening/closing portion installed to be slidable on one end of the upper portion of each of the first speaker mounting portion to the third speaker mounting portion and a second half opening/closing portion installed to be slidable on the other end of the upper portion of each of the first speaker mounting portion to the third speaker mounting portion.

The first half opening/closing portion and the second half opening/closing portion may, when closing the upper space divided on the basis of the first speaker mounting portion to the third speaker mounting portion, more reliably allow a sound generated from the at least one speaker installed in the first speaker mounting portion to the third speaker mounting portion to stay in a predetermined space.

Advantageous Effects

According to the present invention, by a sound output portion, in which a multi-channel sound system is implemented, being installed in a headrest portion and/or a backrest portion of a general chair or replacing the headrest portion, a chair in which the multi-channel sound system is implemented can be provided.

Also, in the multi-channel sound system implemented by the sound output portion, by the sound output portion itself forming a half-closed type space, a sound can be concentrated on a user without propagating to a surrounding space.

Accordingly, since it is possible to impart a three-dimensional effect while improving sound effects of a sound generated from a speaker installed in the sound output portion, a new sound experience can be provided to the user.

Also, in an aspect that a chair in which the sound output portion is provided may also include a plurality of speakers, there is an advantage that the user can experience vivid sounds like those existing in actually reproduced images or game environments only by sitting in the chair.

In addition, since it is possible to transfer generated sounds to the user while the sounds are separated in a variety of directions such as frontward, rearward, sideward, upward, downward directions, and the like in reproduced images or game environments according to positions and the number of speakers separately provided in the chair in addition to the sound output portion, a true multi-channel sound system can be implemented.

DETAILED DESCRIPTION OF EXEMPLARY EMBODIMENTS

Hereinafter, a chair including a multi-channel sound system according to some embodiments of the present invention will be described in detail. Speakers included in the multi-channel sound system mentioned herein may be construed as including a variety of well-known speaker types such as speaker units, thin-film type speakers, and display type speakers as well as speakers in the form of a complete product.

Figure 1:
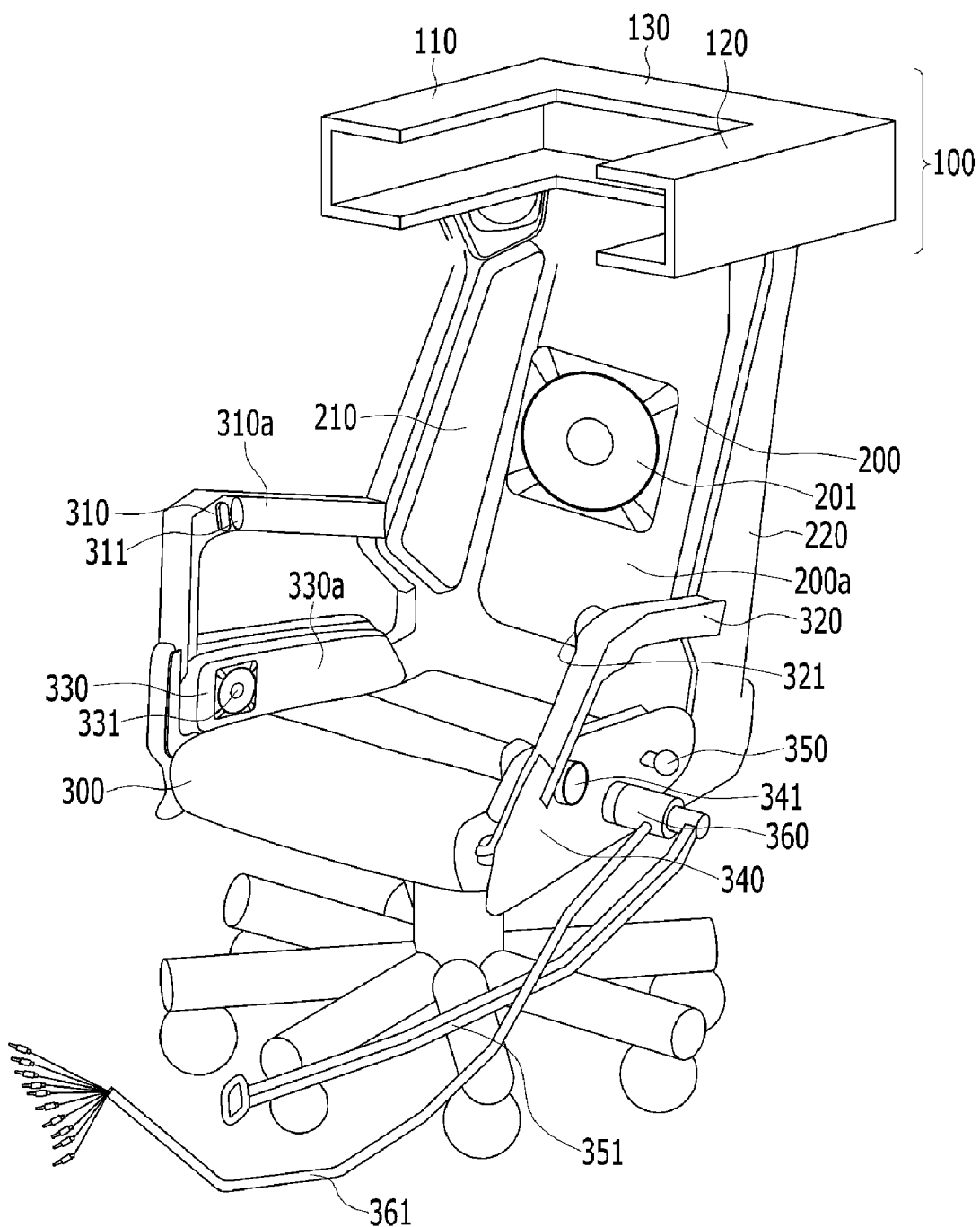
FIGS. 1, 2, and 4 to 6 are perspective views of chairs according to various embodiments of the present invention.
Figure 2:
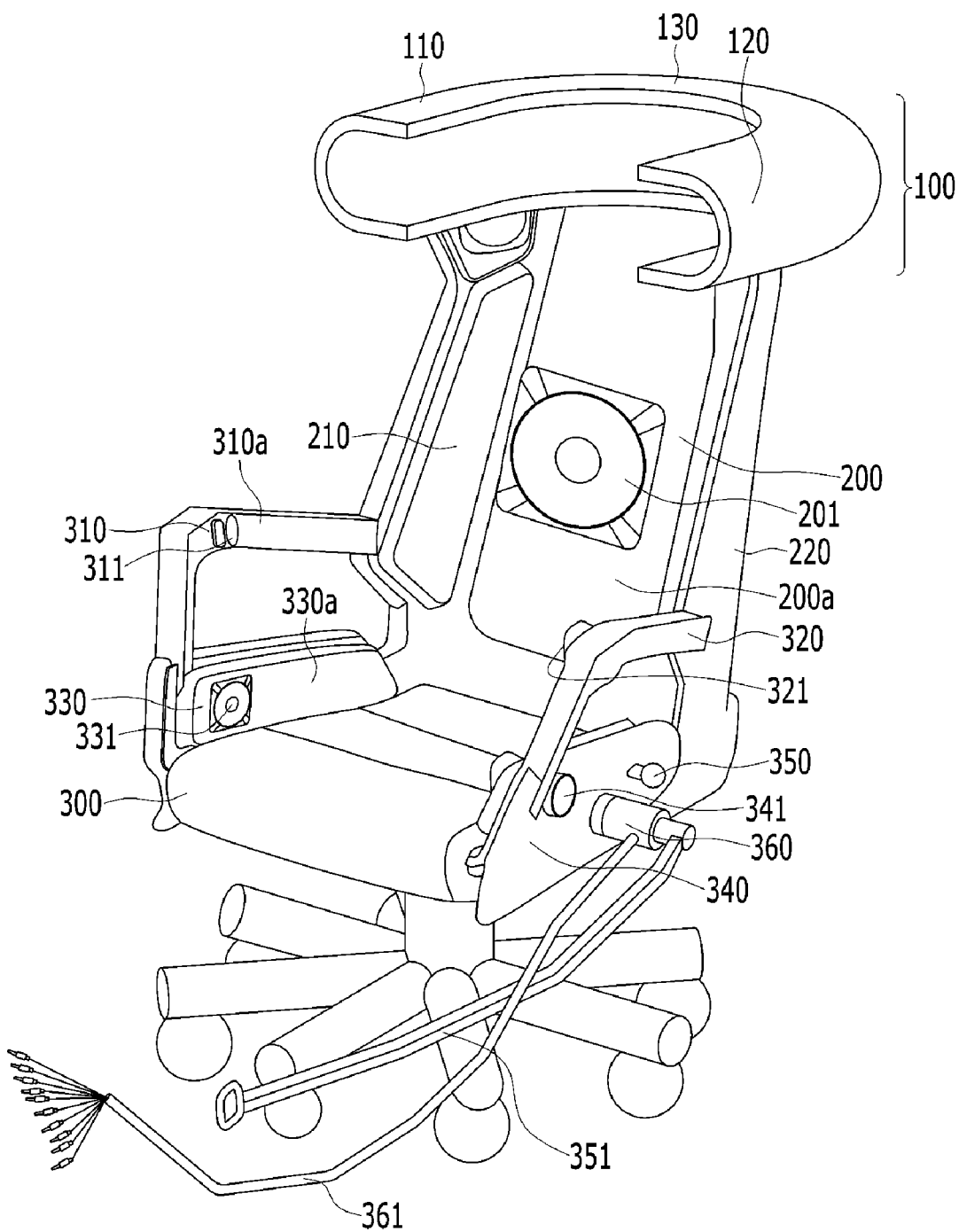

FIG. 1 is a perspective view of a chair according to one embodiment of the present invention, and FIG. 2 is a perspective view of a chair according to another embodiment of the present invention.

FIGS. 1 and 2 illustrate an example of a chair 1000 in which a sound output portion 100 in which the multi-channel sound system is implemented replaces a headrest portion of the chair 1000.

However, the chair 1000 according to the present invention should be construed as including a case in which the sound output portion 100, in which the multi-channel sound system is implemented, is separately installed on a headrest portion, a backrest portion, a seat portion, or armrest portions extending from the seat portion, as well as a case in which the sound output portion 100 replaces the headrest portion.

Referring to FIGS. 1 and 2, the chair 1000 according to one embodiment of the present invention includes at least 1) a headrest portion configured to support the head part of the user, 2) a backrest portion 200 configured to support the back and waist part of the user, and 3) a seat portion 300 configured to support a buttocks part and a part of legs of the user.

Also, the chair 1000 is shown as a movable chair in FIGS. 1 and 2, but the chair 1000 according to the present invention may be provided as a fixed chair, such as Sofa type chair.

The headrest portion is a part which supports the head part of the user who sits in the chair 1000 and in which a front or inside (that is, a part which comes into contact with the head part of the user) may be formed of a cushioning material or have a cushioning material added thereon for comfort of the user.

Also, the sound output portion in which the multi-channel sound system is implemented may be fixedly installed on the front, rear, or another arbitrary area of the headrest portion (for example, a part at which the headrest portion is connected to the backrest portion 200). Here, the sound output portion may be installed on an arbitrary area of the chair using a well-known variety of fixing and coupling methods such as screw-coupling, insertion-coupling, hook-and-loop fastener-coupling, clamp-coupling, and the like. In another case, the sound output portion may be integrally provided in the headrest portion, the backrest portion, and/or the seat portion.

Referring to FIGS. 1 and 2, the sound output portion 100 installed in at least one selected from the headrest portion and the backrest portion 200 and configured to receive a multi-channel sound signal and implement a multi-channel sound system may include a first speaker mounting portion 130 provided to extend in a first direction and in which at least one speaker is installed, a second speaker mounting portion 110 provided to extend in a second direction intersecting the second direction on one side of the first speaker mounting portion 130 and in which at least one speaker is installed, and a third speaker mounting portion 120 provided to extend in the second direction intersecting the first direction on the other side of the first speaker mounting portion 130 and in which at least one speaker is installed.

The first speaker mounting portion 130, the second speaker mounting portion 110, and the third speaker mounting portion 120 are illustrated as components distinguished from each other in the accompanying drawings, but for convenience, the first speaker mounting portion 130, the second speaker mounting portion 110, and the third speaker mounting portion 120 may be integrally formed.

Here, the first direction may be a transverse or longitudinal direction. In a case in which the first direction is the transverse direction, the second direction is the longitudinal direction, and in a case in which the first direction is the longitudinal direction, the second direction is the transverse direction.

Here, the transverse direction may refer to a direction from the user's right hand to the user's left hand while the user sits in the chair. Also, the longitudinal direction may refer to a direction from behind the user to the front of the user while the user sits in the chair.

Also, the first direction and the second direction may refer to directions defined on a plane parallel to the ground.

The first speaker mounting portion 130 may be installed in the headrest portion or replace the headrest portion. When the first speaker mounting portion 130 replaces the headrest portion, in the first speaker mounting portion 130, a cushioning material may be added on a part which comes into contact with the head part of the user to support the head part of the user who sits in the chair.

The first speaker mounting portion 130 is disposed behind the user while the user sits in the chair, and accordingly, the at least one speaker installed in the first speaker mounting portion 130 may separately reproduce a sound generated from behind among sounds in reproduced images or game environments.

Also, since the first speaker mounting portion 130 is formed to extend in the first direction, the speaker installed in the first speaker mounting portion 130 may generate sound from an area ranging from a left rear side to a right rear side as well as from behind the user while the user sits in the chair.

Meanwhile, the second speaker mounting portion 110 may be installed on one side of the first speaker mounting portion 130 (the user's right-hand side or a right side while the user sits in the chair).

The second speaker mounting portion 110 is disposed on the user's right-hand side or the right side while the user sits in the chair, and accordingly, the at least one speaker installed in the second speaker mounting portion 110 may separately reproduce a sound generated from the right side among sounds in reproduced images or game environments.

Since the second speaker mounting portion 110 is provided to extend in the second direction intersecting the first direction, the speaker installed in the second speaker mounting portion 110 may generate sound from an area ranging from the right rear side to a right front side of the user while the user sits in the chair.

Likewise, the third speaker mounting portion 120 may be installed on the other side of the first speaker mounting portion 130 (the user's left-hand side or a left side while the user sits in the chair).

The third speaker mounting portion 120 is disposed on the user's left-hand side or the left side while the user sits in the chair, and accordingly, the at least one speaker installed in the third speaker mounting portion 120 may separately reproduce a sound generated from the left side among sounds in reproduced images or game environments.

Since the third speaker mounting portion 120 is provided to extend in the second direction intersecting the first direction like the second speaker mounting portion 110, the speaker installed in the third speaker mounting portion 120 may generate sound from an area ranging from the left rear side to a left front side of the user while the user sits in the chair.

Here, installation positions of the second speaker mounting portion 110 and the third speaker mounting portion 120 are differentiated as a right side and a left side for convenience, and the second speaker mounting portion 110 may be installed on the left side of the first speaker mounting portion 130, and the third speaker mounting portion 120 may be installed on the right side of the first speaker mounting portion 130.

As illustrated in FIGS. 1 and 2, the first speaker mounting portion 130, the second speaker mounting portion 110, and the third speaker mounting portion 120 may have a size sufficient to wrap around the shoulders or head of the user who sits in the chair 1000, but the size is not necessarily limited thereto, and when necessary, the first speaker mounting portion 130, the second speaker mounting portion 110, and the third speaker mounting portion 120 may have a size sufficient to wrap around the seat portion 300 from the headrest portion of the chair 1000.

Meanwhile, referring to FIG. 2 illustrating a chair 1000 according to another embodiment of the present invention, at least one of the first speaker mounting portion 130, the second speaker mounting portion 110, and the third speaker mounting portion 120 may be formed in a curved shape.

Here, the curved shape may include a case in which at least one of the first speaker mounting portion 130, the second speaker mounting portion 110, and the third speaker mounting portion 120 has a spherical or semi-spherical shape as well as a case in which one area of at least one of the first speaker mounting portion 130, the second speaker mounting portion 110, and the third speaker mounting portion 120 is formed to be curved.

For example, in a case in which the first speaker mounting portion 130 is formed in a curved shape, the first speaker mounting portion 130 may be formed in a curved shape as a whole or may be partially formed in a curved shape.

Referring to FIG. 2, the first speaker mounting portion 130 may be formed to be curved so that both sides face the front. Also, one side of the second speaker mounting portion 110 and one side of the third speaker mounting portion 120 which are each connected to both sides of the first speaker mounting portion 130 may have a curved shape, an angular shape, or a linear shape as necessary.

Due to at least one of the first speaker mounting portion 130, the second speaker mounting portion 110, and the third speaker mounting portion 120 being formed in a curved shape as a whole or partially, there is an advantage of being able to maintain a constant distance, or optimize the distance, between the user who sits in the chair 1000 and the speakers installed in the first speaker mounting portion 130, the second speaker mounting portion 110, and/or the third speaker mounting portion 120. Since the distance between the user who sits in the chair 1000 and the speakers installed in the first speaker mounting portion 130, the second speaker mounting portion 110, and/or the third speaker mounting portion 120 is maintained constant along an arbitrary circle or curve, a sense of difference between sounds generated from a plurality of speakers can be reduced.

Figure 3:
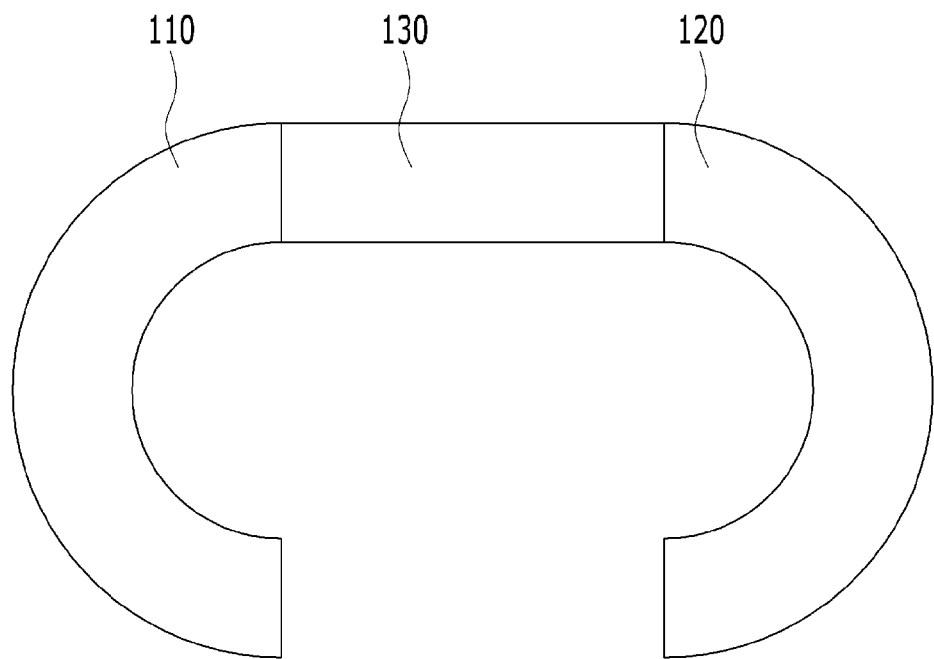
FIG. 3 illustrates a modified example of a sound output portion applied to the chair illustrated in FIG. 2.

Also, referring to FIG. 3 schematically illustrating a sound output portion according to another embodiment of the present invention, the first speaker mounting portion 130 may have a linear shape extending in the first direction, and the second speaker mounting portion 110 and the third speaker mounting portion 120 each provided at both sides of the first speaker mounting portion 130 may be formed in a curved shape.

Figure 4:
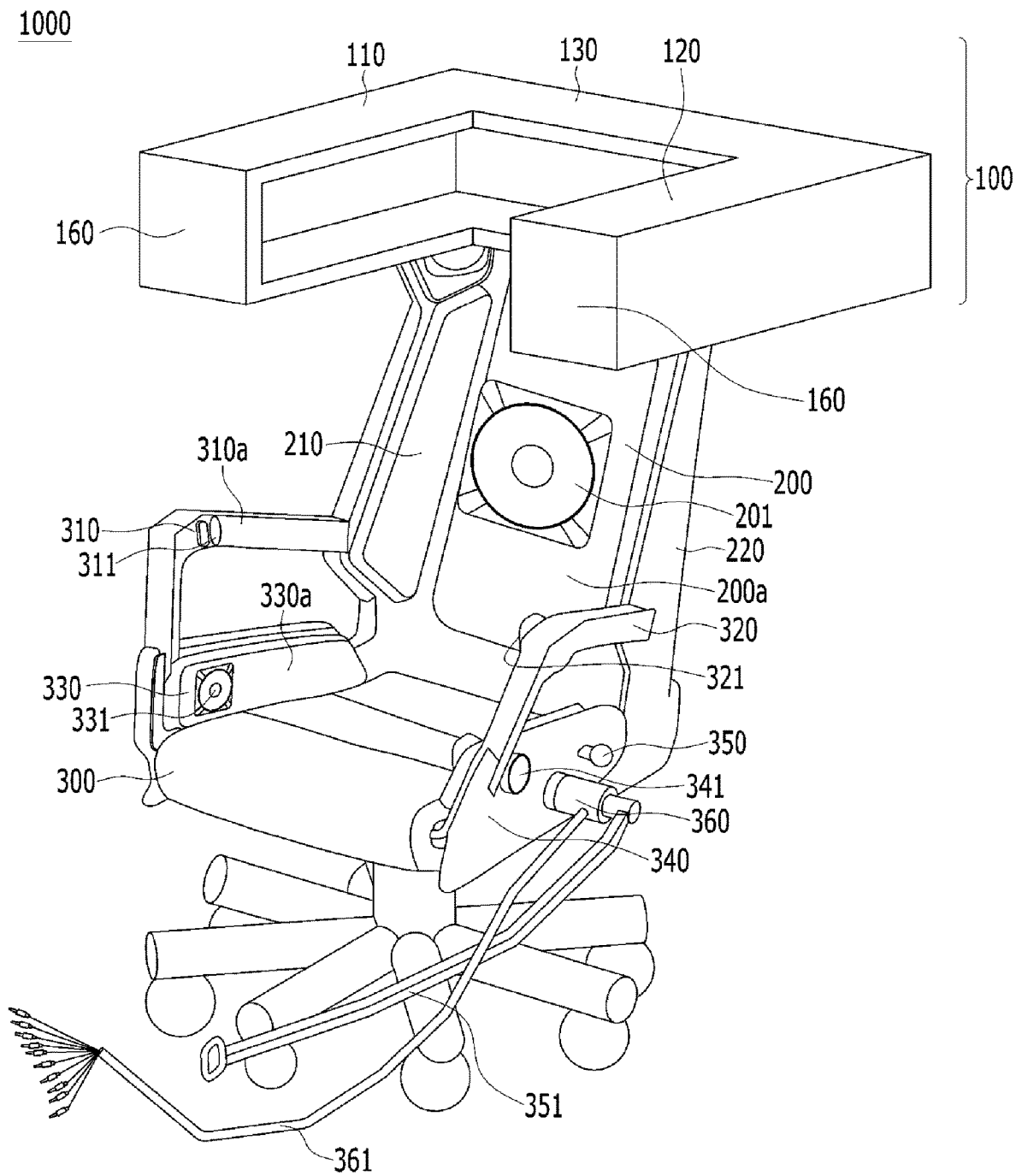
Figure 5:
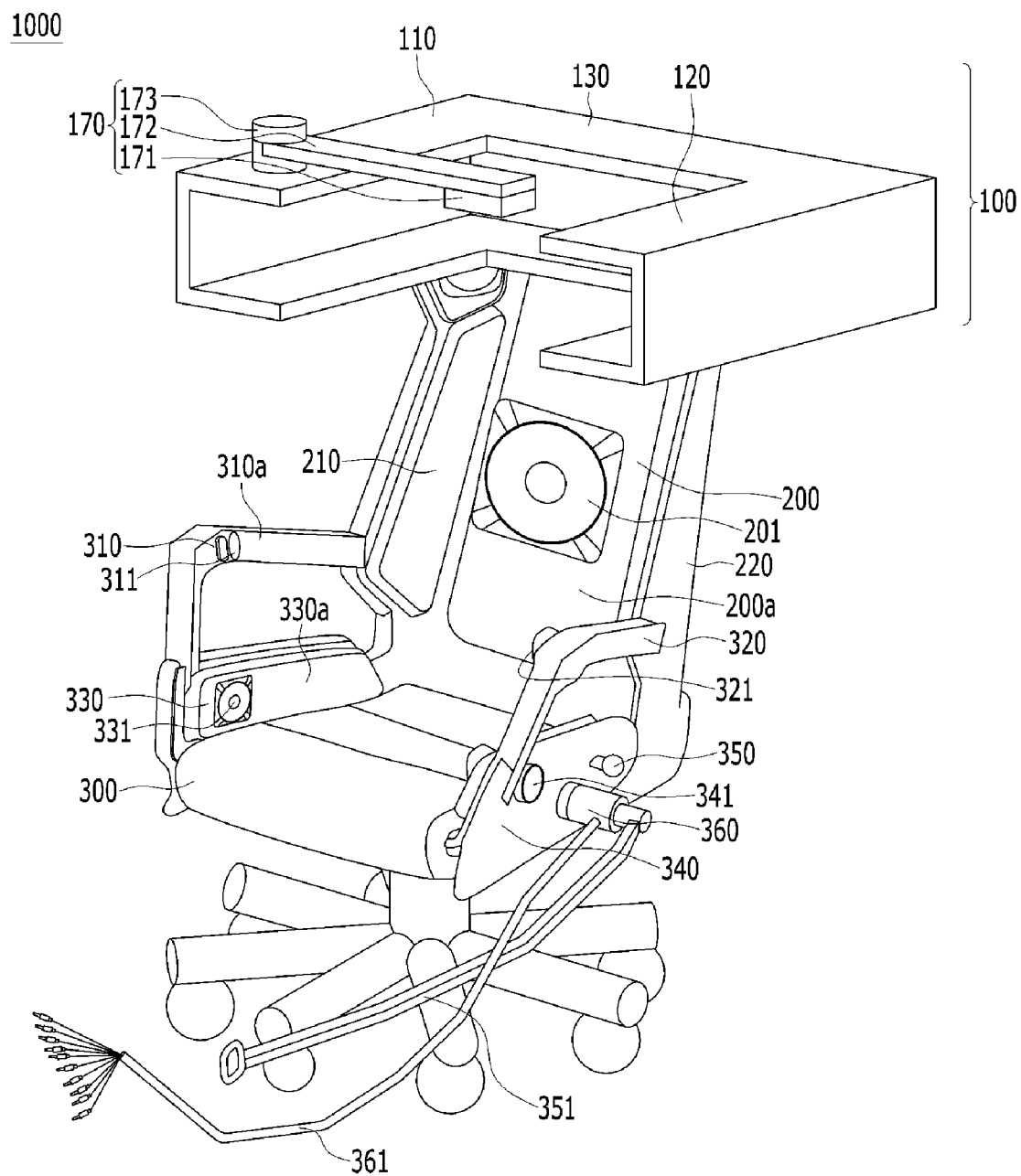
Figure 6:
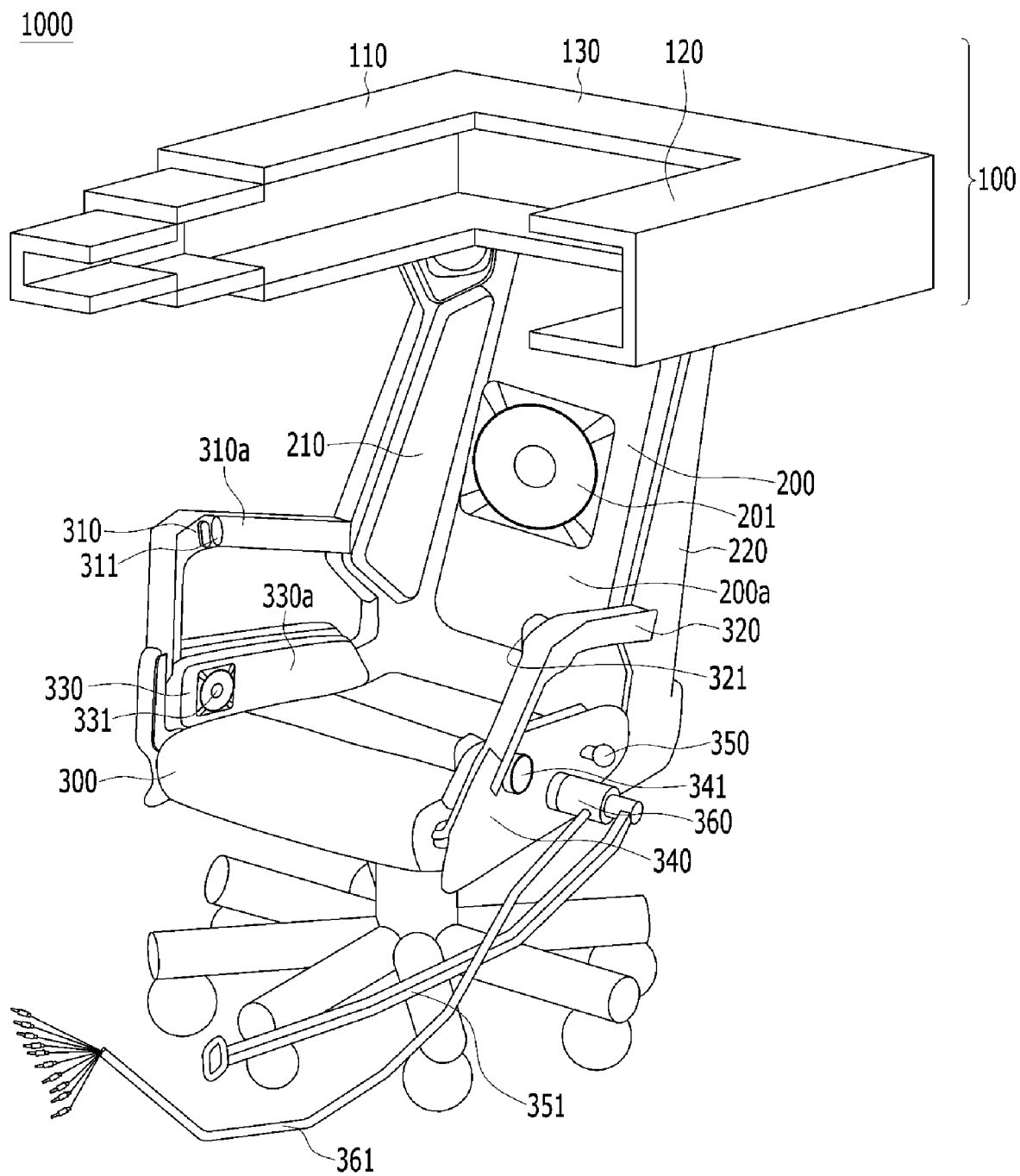

FIGS. 4 to 6 are perspective views of chairs according to various embodiments of the present invention.

Referring to FIG. 4, the chair 1000 may be provided with the front of the second speaker mounting portion 110 and/or the third speaker mounting portion 120 blocked. When the front of the second speaker mounting portion 110 and/or the third speaker mounting portion 120 is blocked, open areas of the second speaker mounting portion 110 and the third speaker mounting portion 120 are closed, and thus, the second speaker mounting portion 110 and the third speaker mounting portion 120 may serve as resonators of sounds generated from inside.

Also, speaker installation areas defined inside the first speaker mounting portion 130, the second speaker mounting portion 110, and the third speaker mounting portion 120 may be divided by at least one partition, and spaces divided from each other by the partition may each serve as a resonator.

In addition, the size or structure of partition may not be necessarily limited thereto, and when necessary, the partition may be the shape of rectangles which occupying one of the first speaker mounting portion 130, the second speaker mounting portion 110, and the third speaker mounting portion 120

Referring to FIG. 5, the chair 1000 may further include a fourth speaker mounting portion 170 installed on at least one of the first speaker mounting portion 130, the second speaker mounting portion 110, and the third speaker mounting portion 120 and configured to be rotatable to allow at least one speaker to be disposed in front of or above the user who sits in the chair 1000.

As an example, in the chair 1000 illustrated in FIG. 5, the fourth speaker mounting portion 170 may be installed on the second speaker mounting portion 110. More specifically, the fourth speaker mounting portion 170 may include a speaker installation stand 172 having at least one speaker 171 installed on one side and a fixing portion 173 configured to fix the other side of the speaker installation stand 172 to the second speaker mounting portion 110.

Also, the fixing portion 173 may serve as a hinge, and accordingly, the speaker installation stand 172 may rotate or fold about the fixing portion 173. For example, the speaker installation stand 172 can, by rotating or folding toward the second speaker mounting portion 110 with respect to the fixing portion 173, prevent the user from being uncomfortable when the user gets up from the chair in which the sound output portion 100 is installed.

Also, the speaker installation stand 172 of the fourth speaker mounting portion 170 may be provided in a semicircular shape or a shape close to a semicircle and may be installed on an upper portion or a rear surface of the first speaker mounting portion 130, the second speaker mounting portion 110, and the third speaker mounting portion 120.

Meanwhile, according to still another embodiment of the present invention, at least one of the first speaker mounting portion 130, the second speaker mounting portion 110, and/or the third speaker mounting portion 120 may have a multi-stage structure provided so that one end is able to be inserted into and withdrawn from the other end.

Referring to FIG. 6, by one end of the second speaker mounting portion 110 (that faces the front of the chair 1000) having the multi-stage structure, the overall length of the second speaker mounting portion 110 may be adjusted as the multi-stage structure is unfolded or folded. Although not separately illustrated in the drawings, the multi-stage structure may be equally applied to the other end of the second speaker mounting portion 110 or on the first speaker mounting portion 130 and the third speaker mounting portion 120.

Figure 7:
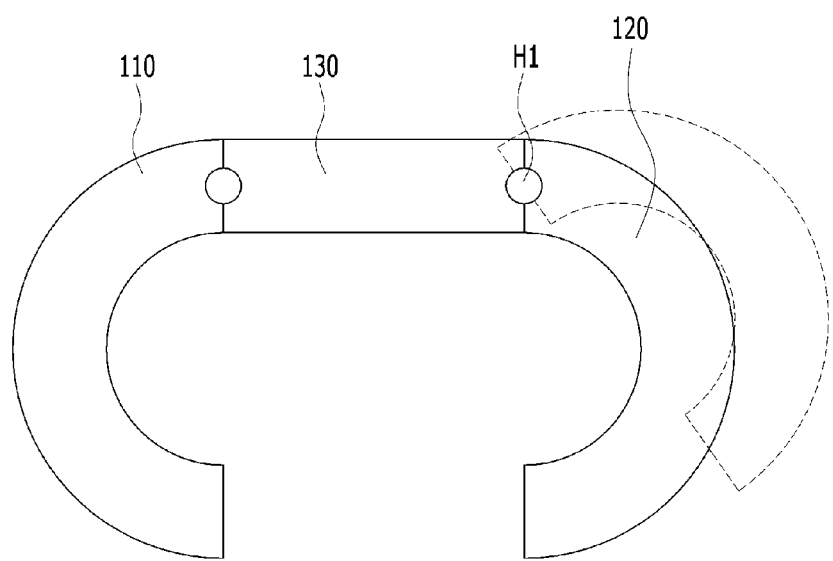
FIGS. 7 to 9 illustrate various modified examples of the sound output portion illustrated in FIG. 3.
Figure 8:
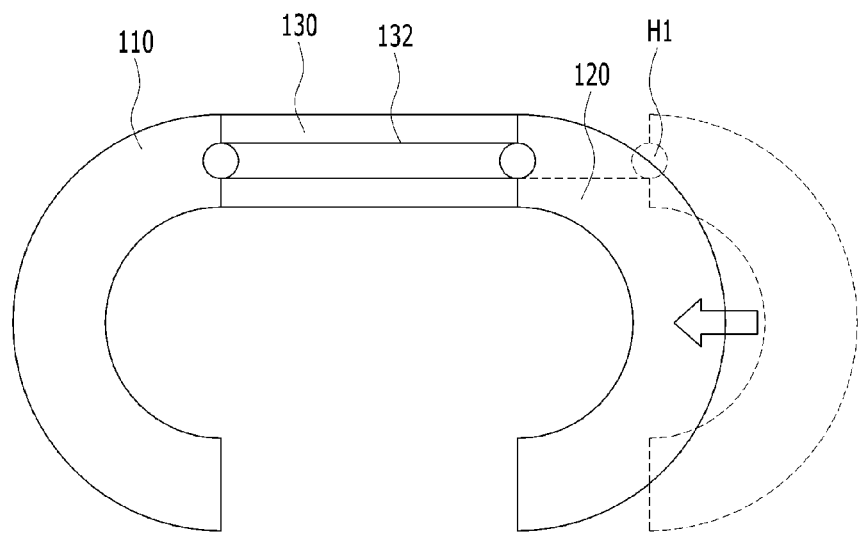
Figure 9:
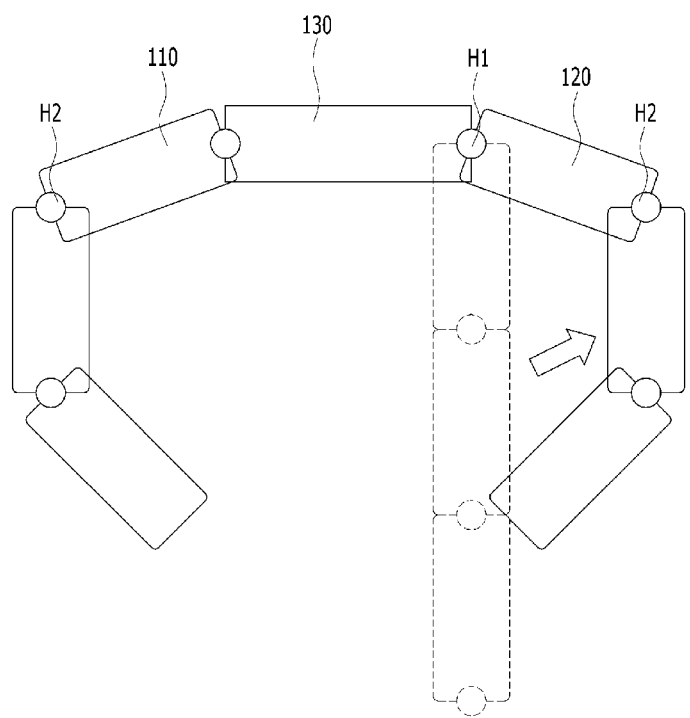

FIGS. 7 to 9 illustrate various modified examples of the sound output portion illustrated in FIG. 3.

First, referring to FIG. 7, the second speaker mounting portion 110 and the third speaker mounting portion 120 may be each rotatably coupled to both sides of the first speaker mounting portion 130.

To this end, coupling between the second speaker mounting portion 110, the third speaker mounting portion 120, and the first speaker mounting portion 130 may be performed with a hinge H1 as a medium.

By the coupling method described above, a distance between the user who sits in the chair 1000 and the second speaker mounting portion 110 and a distance between the user who sits in the chair 1000 and the third speaker mounting portion 120 may be adjusted.

Also, although not separately illustrated in the drawings, the second speaker mounting portion 110 and/or the third speaker mounting portion 120 may be provided to be separable from the first speaker mounting portion 130. When the second speaker mounting portion 110 and/or the third speaker mounting portion 120 are/is provided to be separable from the first speaker mounting portion 130, for example, a second speaker mounting portion 110 having two speakers installed therein may be replaced with another second speaker mounting portion 110 having three speakers mounted thereon.

Likewise, as illustrated in FIG. 8, by adjusting an extension length of the first speaker mounting portion 130, the distance between the user who sits in the chair 1000 and the second speaker mounting portion 110 and the distance between the user who sits in the chair 1000 and the third speaker mounting portion 120 may be adjusted.

Here, a length adjustment portion 132 may be provided on the first speaker mounting portion 130, and the second speaker mounting portion 110 and the third speaker mounting portion 120 may be coupled to the length adjustment portion 132 with the hinge H1 as a medium and may rotate as illustrated in FIG. 7.

Meanwhile, the first speaker mounting portion 130, the second speaker mounting portion 110, and the third speaker mounting portion 120 may include at least one joint H2 and may be provided to be rotatable with the joint H2 as a medium.

That is, referring to FIG. 9, unlike the multi-stage structure that can be inserted and withdrawn as illustrated in FIG. 6, the first speaker mounting portion 130, the second speaker mounting portion 110, and the third speaker mounting portion 120 may include a plurality of unit modules, and unit modules adjacent to each other may be coupled with the joint H2 as a medium, making it possible for each unit module to rotate independently. Also, the unit modules including the joint H2 may be provided to be separable from each other.

Figure 10A:
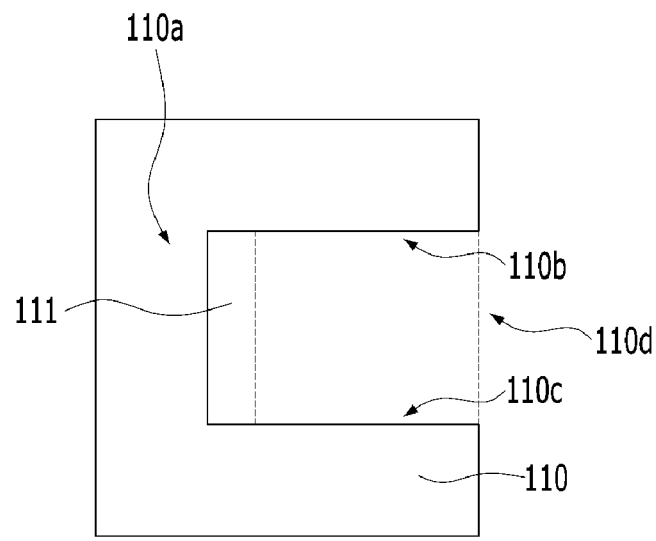
FIGS. 10A and 10B show lateral views of one end portion of a sound output portion applied to the chair illustrated in FIG. 1 and one end portion of the sound output portion applied to the chair illustrated in FIG. 2.
Figure 10B:
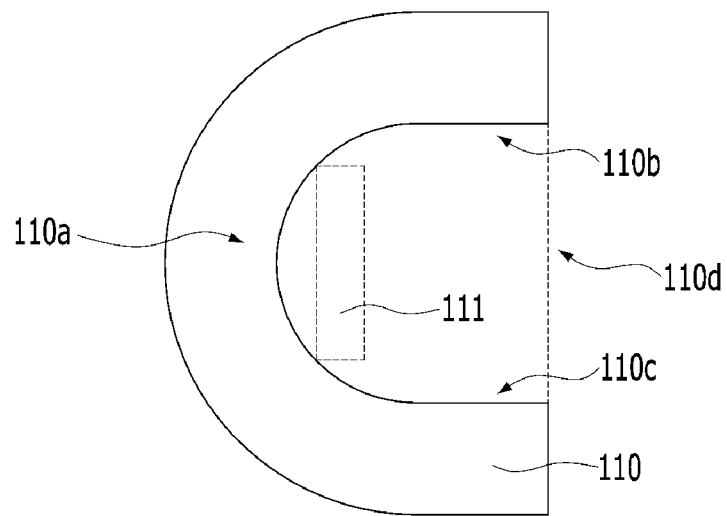

FIGS. 10A and 10B show one end portion of the second speaker mounting portion 110 applied to the chair 1000 illustrated in FIG. 1 and one end portion of the second speaker mounting portion 110 applied to the chair 1000 illustrated in FIG. 2.

FIG. 10A illustrates a shape of the second speaker mounting portion 110 applied to the chair 1000 illustrated in FIG. 1 viewed from the front, and FIG. 10B illustrates a shape of the second speaker mounting portion 110 applied to the chair 1000 illustrated in FIG. 2 viewed from the front. Although FIGS. 10A and 10B, for convenience, illustrate only the second speaker mounting portion 110, it should be understood that the content to be described with reference to FIGS. 10A and 10B are applicable equally to the first speaker mounting portion 130 or the third speaker mounting portion 120.

Referring to FIGS. 10A and 10B, the second speaker mounting portion 110 may be divided into a first area 110a formed to extend in a direction perpendicular to the ground, a second area 110b formed to protrude forward from an upper portion of the first area 110a, and a third area 110c formed to protrude forward from a lower portion of the first area 110a. Each of the areas defined above may be defined as a speaker installation area.

The first area 110a, the second area 110b, and the third area 110c may have a linear shape, a broken-line shape, or a curved shape as a whole or partially. For example, by the second area 110b and the third area 110c being formed to be inclined and protrude from the first area 110a, the second speaker mounting portion 110 may have a tapered shape that widens from a side far from the user who sits in the chair 1000 toward a side close to the user who sits in the chair 1000.

That is, when viewed from the front, the second speaker mounting portion 110 may have a right-angled C-shape, a C-shape, or a shape similar thereto.

When at least one speaker 111 is installed in the first area 110a, due to the protruding structure of the second area 110b and the third area 110c, the speaker 111 is not immediately exposed to the outside.

Accordingly, a sound generated from the speaker 111 may stay in a predetermined space instead of being immediately dispersed to a surrounding space, thus not only providing rich sound effects but also contributing to creating sound environments with a sense of space and a three-dimensional effect. Also, the sound output from the speaker 111 may be further concentrated on the user.

Also, referring to FIG. 10B showing the shape of the second speaker mounting portion 110 applied to the chair 1000 illustrated in FIG. 2 viewed from the front, the upper portion and the lower portion of the first area 110a in which the at least one speaker 111 is installed may be formed to each be curved toward the second area 110b and the third area 110c. Also, one side of the second area 110b connected to the upper portion of the first area 110a and one side of the third area 110c connected to the lower portion of the first area 110a may each have a curved shape or a linear shape as necessary.

Meanwhile, as illustrated in FIG. 4, at least one of the second speaker mounting portion 110 and the third speaker mounting portion 120 may further include a first partition 160 configured to block a front of a space, which is divided by the first area 110a, the second area 110b, and the third area 110c, and protect speakers installed in the second speaker mounting portion 110 and the third speaker mounting portion 120.

The first partition 160 may, while serving to block the front of the space divided by the first area 110a, the second area 110b, and the third area 110c, have at least one speaker selectively installed therein and generate sound from in front of the user who sits in the chair 1000. Here, a direction of the sound output from the at least one speaker installed in the first partition 160 may be toward the user who sits in the chair 1000.

Also, protruding portions of the second area 110b and the third area 110c may be connected by a fourth area 110d, and the fourth area 110d may be provided in the form of a mesh to not interfere with transfer of sound output from the at least one speaker 111 installed in the first area 110a to the user.

In another example, when necessary, instead of installing a speaker in the first area 110a, the second area 110b, and the third area 110c, a speaker may be installed in the fourth area 110d.

Figure 11:
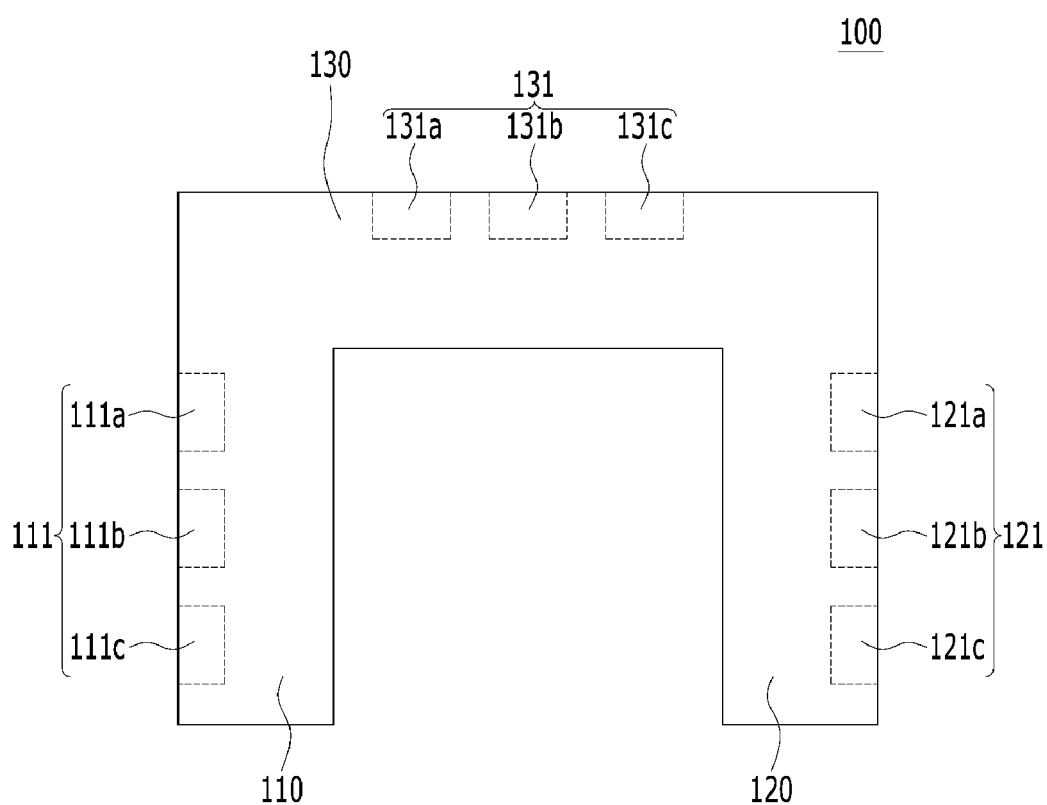
FIG. 11 is a top view of the sound output portion applied to the chair illustrated in FIG. 1.
Figure 12:
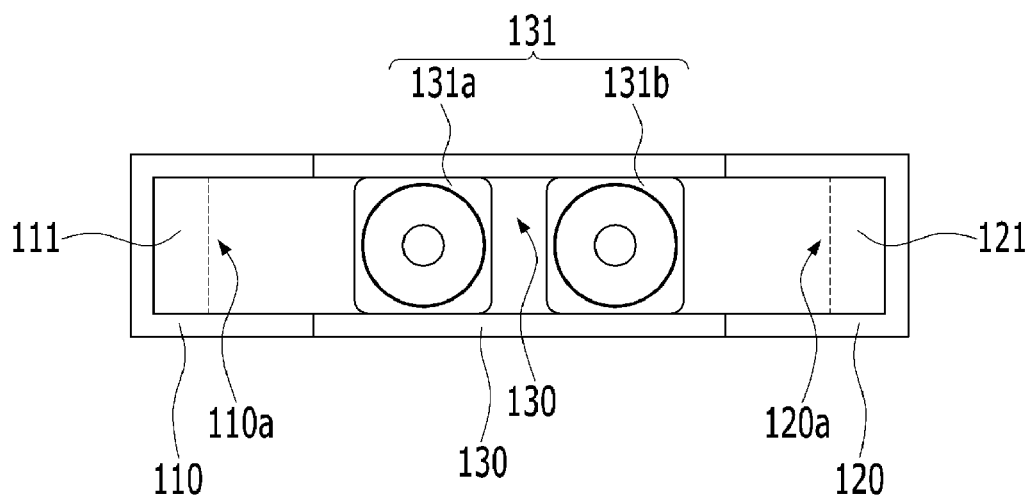
FIG. 12 is a front view of the sound output portion applied to the chair illustrated in FIG. 1.
Figure 13:
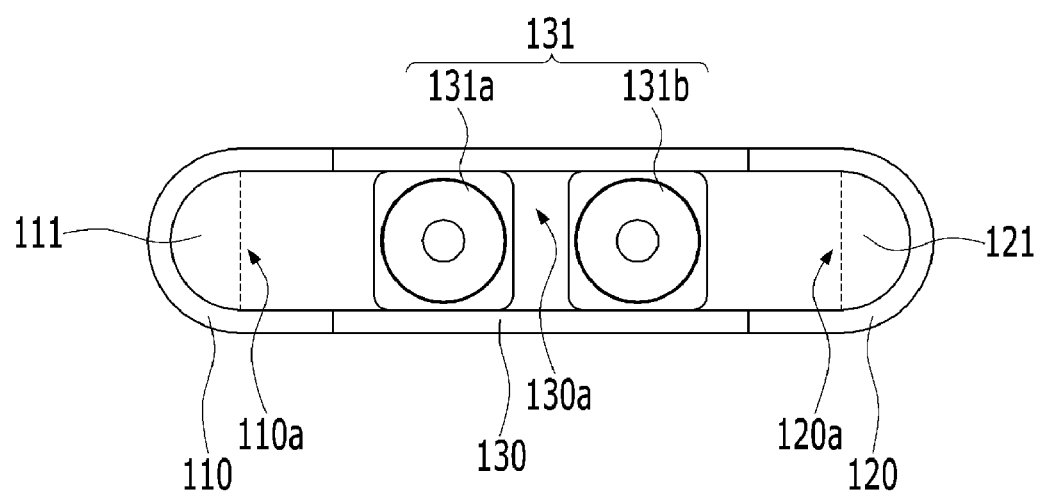
FIG. 13 is a front view of the sound output portion applied to the chair illustrated in FIG. 2.

FIG. 11 shows a top view of the sound output portion 100 applied to the chair 1000 illustrated in FIG. 1, FIG. 12 shows a front view of the sound output portion 100 applied to the chair 1000 illustrated in FIG. 1, and FIG. 13 is a front view of the sound output portion 100 applied to the chair 1000 illustrated in FIG. 2. Although FIG. 11, for convenience, illustrates only the sound output portion 100 applied to the chair 1000 illustrated in FIG. 1, it should be understood that the content to be described with reference to FIG. 11 is applicable equally to the chair 1000 according to various other embodiments mentioned above.

Referring to FIGS. 11 to 13, at least one speaker 131 may be installed in a first area of the first speaker mounting portion 130. When a plurality of speakers 131a, 131b, and 131c are installed in the first area of the first speaker mounting portion 130 as illustrated in FIG. 11, the plurality of speakers 131a, 131b, and 131c may be installed to be spaced at a certain interval apart from each other in a direction in which the first speaker mounting portion 130 extends, that is, a direction from one end of the first speaker mounting portion 130 connected to the second speaker mounting portion 110 to the other end of the first speaker mounting portion 130 connected to the third speaker mounting portion 120.

Also, the at least one speaker 111 may be installed in the first area 110a of the second speaker mounting portion 110. When a plurality of speakers 111a, 111b, and 111c are installed in the first area 110a of the second speaker mounting portion 110 as illustrated in FIG. 11, the plurality of speakers 111a, 111b, and 111c may be installed to be spaced at a certain interval apart from each other from one end of the second speaker mounting portion 110 connected to the first speaker mounting portion 130 toward the other end of the second speaker mounting portion 110 not fixed to the first speaker mounting portion 130.

Likewise, at least one speaker 121 may be installed in a first area 120a of the third speaker mounting portion 120. When a plurality of speakers 121a, 121b, and 121c are installed in the first area 120a of the third speaker mounting portion 120 as illustrated in FIG. 11, the plurality of speakers 121a, 121b, and 121c may be installed to be spaced at a certain interval apart from each other from one end of the third speaker mounting portion 120 connected to the first speaker mounting portion 130 toward the other end of the third speaker mounting portion 120 not fixed to the first speaker mounting portion 130.

Figure 14:
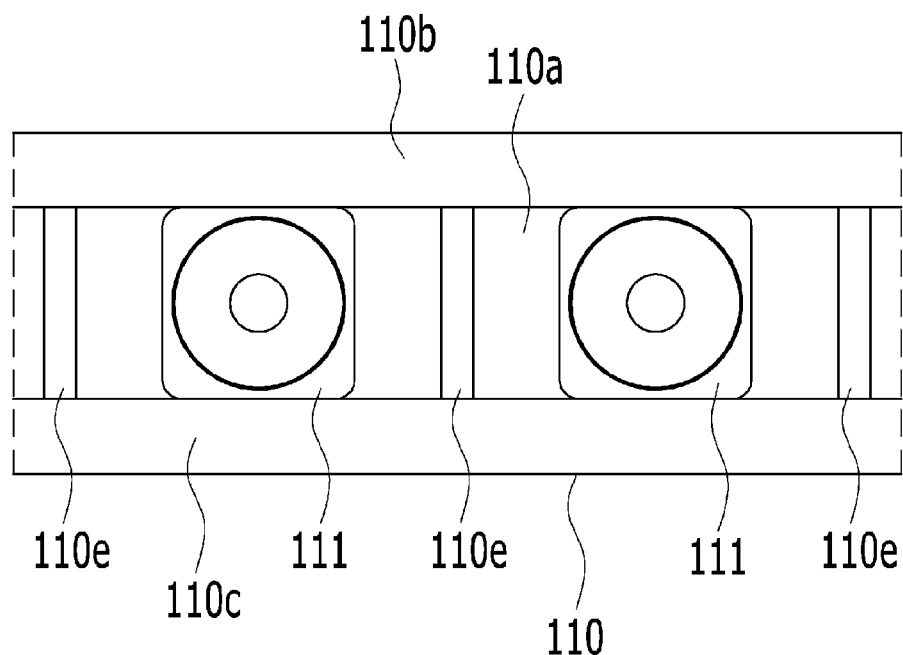
FIG. 14 is a front view illustrating a modified example of a sound output portion applied to a chair according to one embodiment of the present invention.

Meanwhile, referring to FIG. 14, the speaker installation area may further include at least one second partition 110e configured to connect the second area 110b and the third area 110c in a perpendicular direction.

The second partition 110e can, by entirely or partially blocking portions between the plurality of speakers installed in the speaker installation area, prevent sounds output from the speakers from excessively overlapping and being blurred and contribute to improving resolution of the sounds.

As described above, the plurality of speakers 111, 121, and 131 installed in the first speaker mounting portion 130, the second speaker mounting portion 110, and the third speaker mounting portion 120 may implement a multi-channel sound system by receiving and outputting a multi-channel sound signal from a sound source (e.g., home theater, TV, set-top box, sound bar, computer, cellular phone, tablet PC, or the like) separately provided inside or outside the chair 1000.

The backrest portion 200 is a part configured to support the back, the waist, and side parts of the user who sits in the chair 1000 and in which a front or inside (that is, a part which comes into contact with the back, waist, and side parts of the user) may be formed of a cushioning material or have a cushioning material added thereon for comfort of the user.

Also, at least one speaker 201 may be installed in one area of a front or inside of the backrest portion 200. In order to prevent the speaker 201 from coming into direct contact with the user who sits in the chair 1000, the speaker 201 may be inserted into and installed in the backrest portion 200 not to be exposed to the outside. Also, in addition, a control portion configured to control the speaker 201 may be provided in one area of the chair 1000.

The speaker 201 installed in the inside of the backrest portion 200 may be a woofer speaker. In the case of the woofer speaker, since the strength of generated vibration is high in comparison to a general speaker, the woofer speaker may be installed in the backrest portion 200. Also, since the vibration generated by the woofer speaker 201 may be transferred directly to the user who sits in the chair 1000, there is an advantage of providing a more vivid user experience, and vibrations may be emphasized by connecting a vibration generator to a wire connected to the woofer speaker.

Also, side bolster portions 210 and 220 formed to protrude toward the inside of the backrest portion 200 and configured to support side parts of the user who sits in the chair 1000 may be provided on both sides of the backrest portion 200.

Here, although not separately illustrated in the drawings, at least one speaker may be installed on an inside of the side bolster portion 210 or 220.

Since it is possible to generate a sound at a bottom through the at least one speaker installed on the inside of the side bolster portion 210 or 220, the user who sits in the chair 1000 may actually feel the sound generated from the bottom in an image or in game environments.

The seat portion 300 is a part configured to support at least a buttocks part and a part of legs of the user who sits in the chair 1000 and in which a top (that is, a part which comes into contact with the buttocks part and the part of the legs of the user) may be formed of a cushioning material or have a cushioning material added thereon for comfort of the user. Also, although not separately illustrated in the drawings, at least one speaker may be installed in one area of the inside of the seat portion 300. In order to prevent the speaker from coming into direct contact with the user who sits in the chair 1000, the speaker may be inserted into and installed in the seat portion 300 not to be exposed to the outside, or the speaker may be installed to be exposed to the outside on left and right sides of the seat portion 300. Also, in addition, a control portion configured to control the speaker may be provided in one area of the chair 1000.

The speaker installed inside the seat portion 300 may be a woofer speaker. In the case of the woofer speaker, since the strength of generated vibration is high in comparison to a general speaker, the woofer speaker may be installed in the seat portion 300. Also, since the vibration generated by the woofer speaker may be transferred directly to the user who sits in the chair 1000, there is an advantage of providing a more vivid user experience, and vibrations may be emphasized by connecting a vibration generator to a wire connected to the woofer speaker.

Meanwhile, when the woofer speaker is provided in the chair, a vibration relaxation member may be further provided on a lower portion of the seat portion 300.

Also, armrest portions 310 and 320 configured to support arm parts of the user who sits in the chair 1000 and auxiliary seat portions 330 and 340 configured to support the part of the legs of the user who sits in the chair 1000 may be provided on both sides of the backrest portion 200 or the seat portion 300.

At least one speaker 311 may be installed on an inside 310a of the armrest portion 310, which may be equally applied to the armrest portion 320 on an opposite side thereof. Also, at least one speaker 331 may be installed on an inside 330a of the auxiliary seat portion 330, which may be equally applied to the auxiliary seat portion 340 on opposite side thereof.

A binding portion on which a woofer switch 350 and one end of a binding cable 351 configured to restrict a movement range of the chair 1000 are installed and a connection portion 360 on which one end of a connection cable 361 configured to provide power and a sound signal to a multi-channel speaker installed in the chair 1000 may be provided in the same place in one area of the seat portion 300 (for example, one area of the auxiliary seat portion 340), but the binding portion and the connection portion may be separately installed as necessary.

The one end of the binding cable 351 may be fixed to the connection portion 360 while the other end of the binding cable 351 may be connected to, for example, a desk or the like so as to restrict the movement range of the chair 1000. Accordingly, it is possible to prevent the connection cable 361 from being disconnected, to prevent the connection portion 360 in which one end of the connection cable 361 is installed from being damaged, or to prevent a connected part of a sound source (for example, home theater, TV, set-top box, sound bar, computer, cellular phone, tablet PC, or the like) in which the other end of the connection cable 361 is installed from being damaged, due to excessive movement of the chair 1000 which exceeds a movable range of the connection cable 361.

Also, in another embodiment, the chair 1000 may wirelessly receive a sound signal at the multi-channel speaker installed in the chair 1000.

In this case, the chair 1000 may include a wireless reception portion (not shown) configured to wirelessly receive the sound signal at the multi-channel speaker installed in the chair 1000. The wireless reception portion may wirelessly transmit or receive sound signals to or from a sound source (for example, home theater, TV, set-top box, sound bar, computer, cellular phone, tablet PC, or the like) using a method such as Wi-Fi, Bluetooth, digital enhanced cordless telecommunications (DECT), Li-Fi, and the like.

Figure 15:
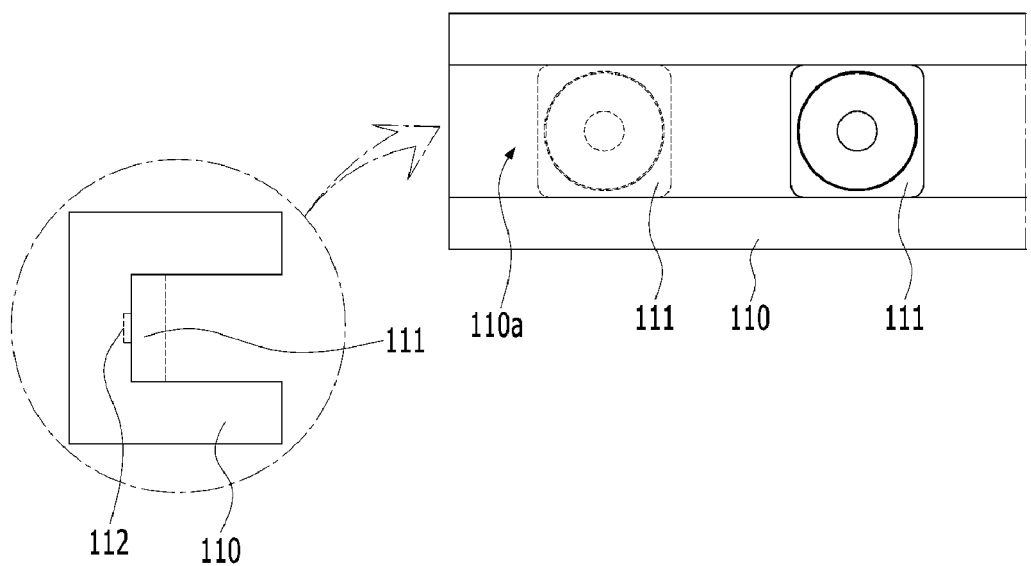
FIGS. 15 to 17 illustrate some modified examples of the sound output portion applied to the chair illustrated in FIG. 1.
Figure 16:
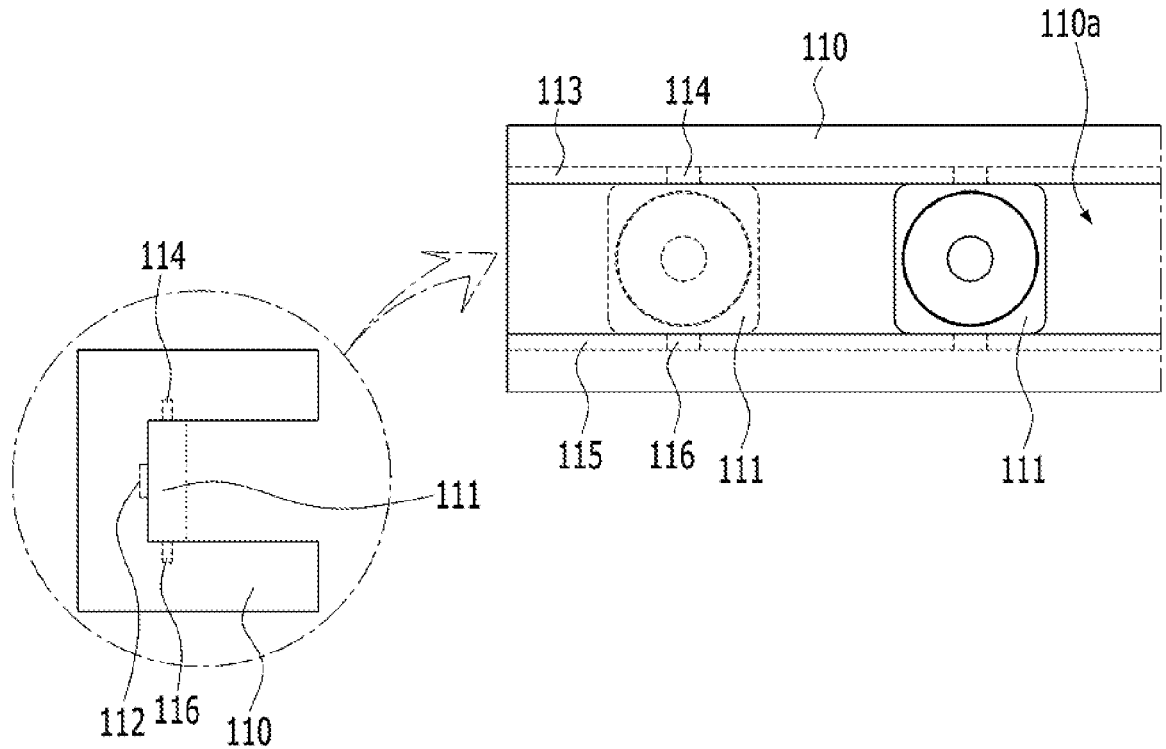
Figure 17:
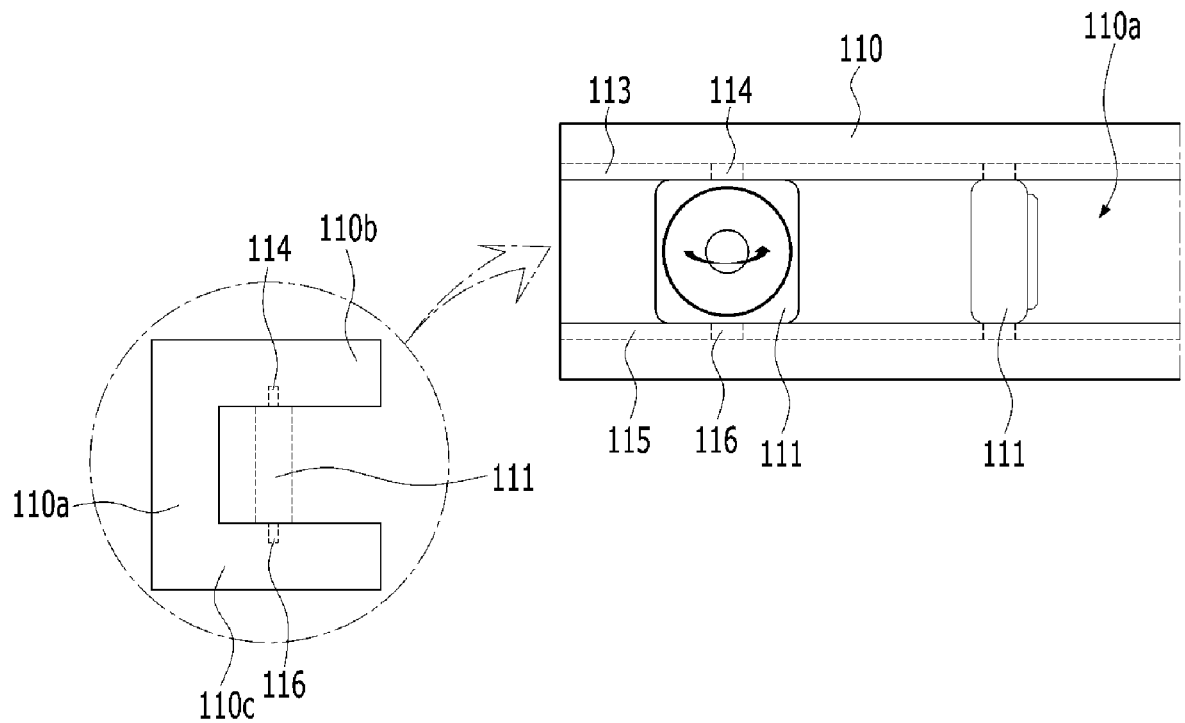

FIGS. 15 to 17 illustrate some modified examples of the sound output portion 100 applied to the chair 1000 illustrated in FIG. 1. Although FIGS. 15 to 17, for convenience, illustrate only the second speaker mounting portion 110, it should be understood that the content to be described with reference to FIGS. 15 to 17 is applicable equally to the first speaker mounting portion 130 and the third speaker mounting portion 120. Also, the content to be described with reference to FIGS. 15 to 17 is applicable equally to the sound output portion 100 applied to the chair 1000 according to various other embodiments mentioned above.

Referring to FIG. 15, the at least one speaker 111 installed in the first area 110a of the second speaker mounting portion 110 may be installed to be slidably movable in a direction in which the second speaker mounting portion 110 extends. Accordingly, there is an advantage that each user may be allowed to customize a sound system for himself or herself by adjusting a position of the at least one speaker 111 installed in the second speaker mounting portion 110.

Specifically, a slide space 112 having a shape bent in the direction in which the second speaker mounting portion 110 extends may be formed in the first area 110a of the second speaker mounting portion 110. The speaker 111 may be installed to be slidable in the slide space 112.

Meanwhile, referring to FIG. 16, sliding rails 113 and 115 may be selectively provided in the second area 110b and the third area 110c in addition to the slide space 112 illustrated in FIG. 15.

The slide space 112 and the sliding rails 113 and 115 may be formed to pass through the second speaker mounting portion 110 but formed such that an outer surface of the second speaker mounting portion 110 is blocked.

Sliding members 114 and 116 provided above and/or below the speaker 111 installed in the first area 110a are installed to be slidably movable on the sliding rails 113 and 115.

The speaker 111 may be slidably movable in the direction in which the second speaker mounting portion 110 extends while being stably supported by the sliding rails 113 and 115 and additionally in the slide space 112 by the sliding members 114 and 116. The speaker 111 may be slidably movable using a well-known sliding device such as a groove and a protrusion, a hook-and-loop fastener, a magnet, a wheel, and a bearing.

Also, referring to FIG. 17, the sliding members 114 and 116 may be provided as rotatable members so that the speaker 111 supported by the sliding rails 113 and 115 is rotatable on the basis of an axial direction. In this case, for a rotation space of the speaker 111 to be secured, the speaker 111 may be spaced apart from the first area 110a and installed in the second area 110b and/or the third area 110c.

Accordingly, the at least one speaker 111 installed in the second speaker mounting portion 110 is, while being slidably movable in the direction in which the second speaker mounting portion 110 extends, rotatable on the basis of the axial direction so as to implement more diverse sound environments. The sliding movement and axial rotation may be performed manually but may be automatically performed using a control device and a sensor which detects movement of the user.

Figure 18:
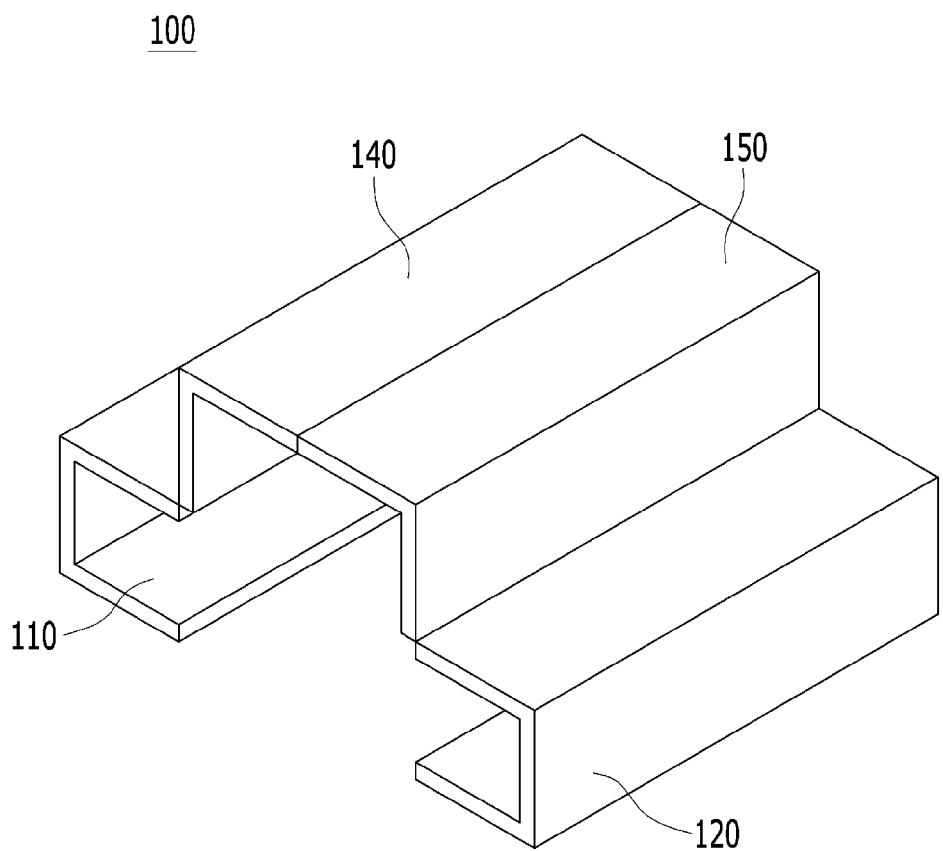
FIG. 18 illustrates a modified example of a sound output portion applied to a chair according to one embodiment of the present invention.
Figure 19:
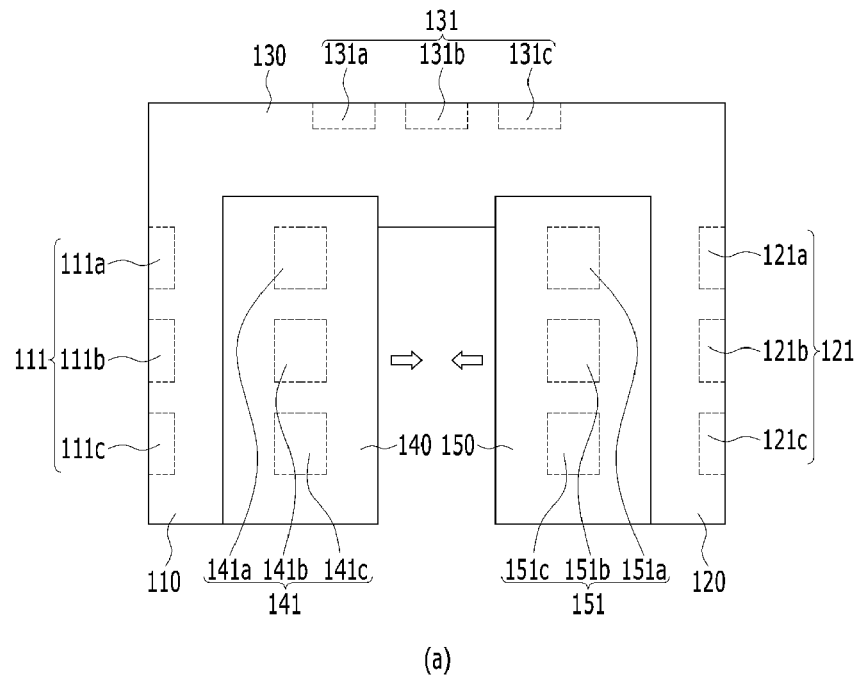
FIG. 19 is a top view of the sound output portion illustrated in FIG. 18.
Figure 19:
Figure 19:
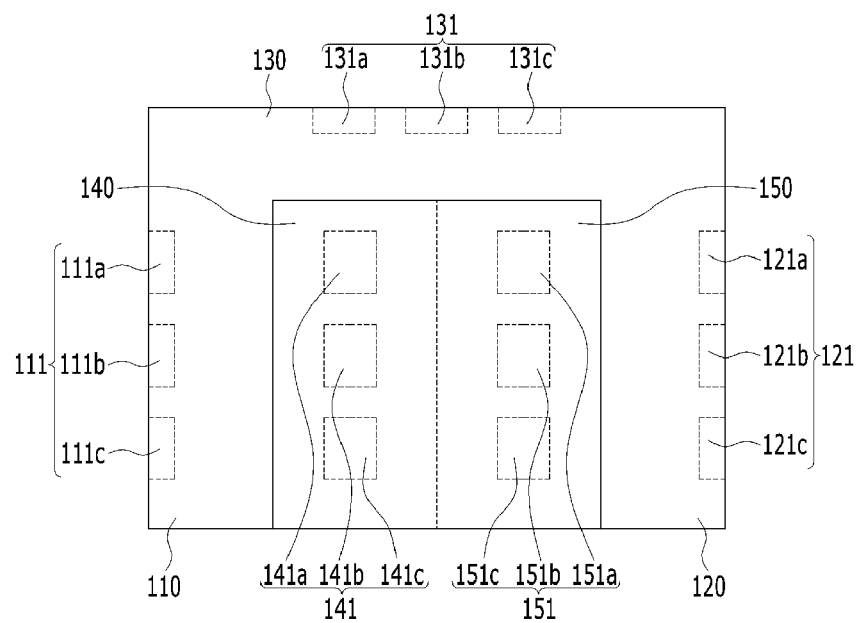
Figure 20:
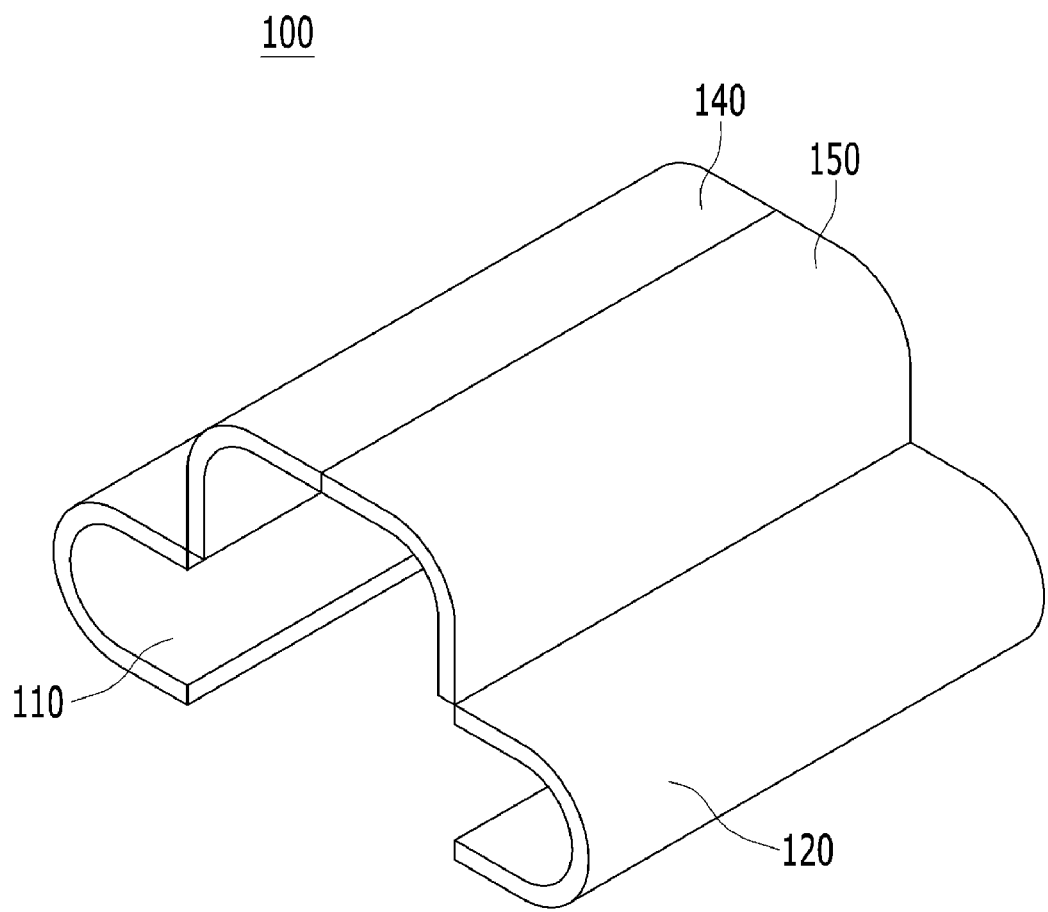
FIG. 20 illustrates another modified example of the sound output portion illustrated in FIG. 18.

FIG. 18 illustrates a modified example of a sound output portion applied to a chair according to one embodiment of the present invention, FIG. 19 is a top view of the sound output portion illustrated in FIG. 18, and FIG. 20 illustrates another modified example of the sound output portion illustrated in FIG. 18.

Although FIG. 18, for convenience, illustrates only opening/closing portions 140 and 150 applied to the chair 1000 illustrated in FIG. 1, it should be understood that the content to be described with reference to FIG. 18 is applicable equally to the chair 1000 according to various other embodiments mentioned above.

Referring to FIGS. 18 to 20, the sound output portion 100 including the first speaker mounting portion 130, the second speaker mounting portion 110, and the third speaker mounting portion 120 further includes the opening/closing portions 140 and 150 installed to be slidably movable on each of the first speaker mounting portion 130, the second speaker mounting portion 110, and the third speaker mounting portion 120 to open or close an upper space divided on the basis of the first speaker mounting portion 130, the second speaker mounting portion 110, and the third speaker mounting portion 120.

Here, for example, when it is assumed that the first speaker mounting portion 130, the second speaker mounting portion 110, and the third speaker mounting portion 120 are installed on a single plane in the sound output portion 100 applied to the chair 1000 illustrated in FIG. 1, the upper space divided on the basis of the first speaker mounting portion 130, the second speaker mounting portion 110, and the third speaker mounting portion 120 may refer to an arbitrary space disposed above the plane on which the first speaker mounting portion 130, the second speaker mounting portion 110, and the third speaker mounting portion 120 are installed.

The opening/closing portions 140 and 150 may, by opening or closing the upper space as necessary, create relatively closed sound environments when closing the upper space and allow the user to experience sound environments with a greater three-dimensional effect. Meanwhile, the opening/closing portions 140 and 150 may, by opening the upper space, prevent the user from being uncomfortable when the user gets up from the chair in which the sound output portion 100 is installed.

In addition, although not separately illustrated in the drawings, the opening/closing portions 140 and 150 may be, instead of being provided to protrude upward from the first speaker mounting portion 130, the second speaker mounting portion 110, and the third speaker mounting portion 120, provided by the second area 110b of the second speaker mounting portion 110 and the second area 110b of the third speaker mounting portion 120 horizontally extending and coming into contact with each other.

Also, referring to FIGS. 17 and 18, the opening/closing portions 140 and 150 may include a first half opening/closing portion 140 installed to be slidable on one end of the upper portion of each of the first speaker mounting portion 130, the second speaker mounting portion 110, and the third speaker mounting portion 120 and a second half opening/closing portion 150 installed to be slidable on the other end of the upper portion of each of the first speaker mounting portion 130, the second speaker mounting portion 110, and the third speaker mounting portion 120.

Here, the first half opening/closing portion 140 and the second half opening/closing portion 150 may be provided to extend in the same direction as a direction in which the second speaker mounting portion 110 and the third speaker mounting portion 120 extend, but the first half opening/closing portion 140 and the second half opening/closing portion 150 are not necessarily limited thereto. That is, the first half opening/closing portion 140 and the second half opening/closing portion 150 may be formed to have a size and shape sufficient to, by sliding, open or close the upper space divided on the basis of the first speaker mounting portion 130, the second speaker mounting portion 110, and the third speaker mounting portion 120.

Devices for fixing to each other may be provided in the first half opening/closing portion 140 and/or the second half opening/closing portion 150 so that the first half opening/closing portion 140 and the second half opening/closing portion 150 may be fixed while closing the upper space divided on the basis of the first speaker mounting portion 130, the second speaker mounting portion 110, and the third speaker mounting portion 120.

As illustrated in FIG. 18, the first half opening/closing portion 140 and the second half opening/closing portion 150 may, by sliding from an upper portion of the second speaker mounting portion 110 and an upper portion of the third speaker mounting portion 120, respectively, toward a space above the head of the user sitting in the chair 1000, form a cover configured to half-close a space around the user's head as a result.

Also, referring to FIG. 19, at least one speaker 141 and at least one speaker 151 may be installed on an inside of the first half opening/closing portion 140 and an inside of the second half opening/closing portion 150, respectively. When, as illustrated in FIG. 19, a plurality of speakers 141a, 141b, and 141c and a plurality of speakers 151a, 151b, and 151c are installed in the inside of the first half opening/closing portion 140 and the inside of the second half opening/closing portion 150, respectively, the plurality of speakers 141a, 141b, and 141c and the plurality of speakers 151a, 151b, and 151c may be installed to be spaced at a certain interval apart from each other in a direction in which the first half opening/closing portion 140 and the second half opening/closing portion 150 extend.

In this way, in the case of a multi-channel sound system implemented by the sound output portion 100 including the opening/closing portions 140 and 150, in addition to the sound output portion 100 itself forming a half-closed type space in a certain portion, an overall half-closed type space may be formed around the user due to closing of the opening/closing portions 140 and 150, and accordingly, since it is possible to impart a three-dimensional effect while improving sound effects of sounds generated from a plurality of speakers installed in the sound output portion 100, a new sound experience can be provided to the user.

Also, referring to FIG. 20, at least one area of the first half opening/closing portion 140 and the second half opening/closing portion 150 may be formed in a curved shape and, here, may form an exterior with a sense of unity together with the second speaker mounting portion 110 and the third speaker mounting portion 120 which are formed in a curved shape.

Also, different from those illustrated in FIGS. 18 and 20, the first half opening/closing portion 140 and the second half opening/closing portion 150 may have a semi-spherical shape, that is, a dome shape, in a case in which the first half opening/closing portion 140 and the second half opening/closing portion 150 slide and close the upper space divided on the basis of the first speaker mounting portion to the third speaker mounting portion.

What is claimed is:

1. A chair including a multi-channel sound system, including at least 1) a headrest portion configured to support a head part of a user, 2) a backrest portion configured to support a back and waist part of the user, and 3) a seat portion configured to support a buttocks part and a part of legs of the user, the chair comprising:
   a sound output portion installed in at least one of the headrest portion, the backrest portion, and the seat portion and configured to receive a multi-channel sound signal and implement a multi-channel sound system,
   wherein the sound output portion includes a first speaker mounting portion provided to extend in a transverse direction and in which at least one speaker is installed and a second speaker mounting portion and a third speaker mounting portion provided to extend in a longitudinal direction on both sides of the first speaker mounting portion and in which at least one speaker is installed,
   wherein each of the first speaker mounting portion, the second speaker mounting portion, and the third speaker mounting portion comprises:
      a first panel extending in a vertical direction;
      a second panel protruding from an upper end of the first panel toward where a user who sits in the chair is positioned; and
      a third panel protruding from a lower end of the first panel toward where the user who sits in the chair is positioned,
   wherein the first panel, the second panel, and the third panel form a half-closed structure that is closed by the first panel, the second panel, and the third panel,
   wherein at least one speaker is installed inside the half-closed structure, and
   wherein an entire portion of at least one speaker is positioned inside the half-closed structure.

2. The chair of claim 1, wherein at least one of the first panel, the second panel, and the third panel is formed in a curved shape.

3. The chair of claim 1, wherein the half-closed structure further includes at least one partition configured to connect the second panel and the third panel in a perpendicular direction.

4. The chair of claim 1, wherein at least one of the first speaker mounting portion, the second speaker mounting portion, and the third speaker mounting portion is formed in a curved shape.

5. The chair of claim 4, wherein:
   the first speaker mounting portion has a linear shape; and
   the second speaker mounting portion and the third speaker mounting portion have the curved shape.

6. The chair of claim 1, wherein the at least one speaker is installed to be slidably movable in a direction in which the speaker mounting portion having the at least one speaker installed therein extends.

7. The chair of claim 1, wherein at least one speaker is installed to be rotatable on the basis of an axial direction.

8. The chair of claim 1, wherein at least one of the first speaker mounting portion, the second speaker mounting portion, and the third speaker mounting portion is provided to have an adjustable extension length.

9. The chair of claim 1, wherein the second speaker mounting portion and the third speaker mounting portion are each rotatably coupled to both sides of the first speaker mounting portion.

10. The chair of claim 1, wherein the first speaker mounting portion, the second speaker mounting portion, and the third speaker mounting portion include at least one joint and are provided to be rotatable with the joint as a medium.

11. The chair of claim 1, wherein the sound output portion further includes an opening/closing portion installed to be slidably movable on an upper portion of each of the first speaker mounting portion, the second speaker mounting portion, and the third speaker mounting portion, and configured to open or close an upper space divided on the basis of the first speaker mounting portion, the second speaker mounting portion, and the third speaker mounting portion.

12. The chair of claim 11, wherein the opening/closing portion includes:
   a first half opening/closing portion installed to be slidable on one end of the upper portion of each of the first speaker mounting portion, the second speaker mounting portion, and the third speaker mounting portion; and
   a second half opening/closing portion installed to be slidable on the other end of the upper portion of each of the first speaker mounting portion, the second speaker mounting portion, and the third speaker mounting portion.

13. The chair of claim 12, wherein at least one area of the first half opening/closing portion and the second half opening/closing portion is formed in a curved shape.

14. The chair of claim 12, wherein at least one speaker is installed on insides of the first half opening/closing portion and the second half opening/closing portion.

15. The chair of claim 1, wherein the sound output portion is installed in the headrest portion, a part where the headrest portion and the backrest portion are connected, or the backrest portion.

16. The chair of claim 1, wherein the sound output portion is integrally formed with the headrest portion, a part where the headrest portion and the backrest portion are connected, or the backrest portion.

17. The chair of claim 1, wherein the first panel of each of the first speaker mounting portion, the second speaker mounting portion, and the third speaker mounting portion has a seamless outer surface.

\* \* \* \* \*